US012590793B2

(12) United States Patent
Shi et al.

(10) Patent No.: US 12,590,793 B2
(45) Date of Patent: Mar. 31, 2026

(54) HEIGHT MEASUREMENT SYSTEM

(71) Applicant: Guilin Gemred Sensor Technology Co., Ltd., Guilin (CN)

(72) Inventors: Mengying Shi, Guilin (CN); Bing Liang, Guilin (CN); Guanglu Yang, Guilin (CN); Jinhua Lan, Guilin (CN); Jingkun Zhou, Guilin (CN); Yue Wu, Guilin (CN)

(73) Assignee: EMRED SENSOR TECHNOLOGY CO., LTD, Guilin (CN)

( * ) Notice: Subject to any disclaimer, the term of this patent is extended or adjusted under 35 U.S.C. 154(b) by 353 days.

(21) Appl. No.: 18/407,370

(22) Filed: Jan. 8, 2024

(65) Prior Publication Data

US 2025/0035420 A1　Jan. 30, 2025

(30) Foreign Application Priority Data

Jul. 27, 2023　(CN) .......................... 202321996756.7
Oct. 13, 2023　(CN) .......................... 202311331447.2

(51) Int. Cl.
　　*G01B 5/06*　　　(2006.01)
　　*G01B 3/1094*　　(2020.01)
(52) U.S. Cl.
　　CPC ........... *G01B 5/061* (2013.01); *G01B 3/1094* (2020.01)
(58) Field of Classification Search
　　CPC .............................. G01B 5/061; G01B 3/1094
　　See application file for complete search history.

(56) References Cited

U.S. PATENT DOCUMENTS

| | | | | |
|---|---|---|---|---|
| 4,518,052 A * | 5/1985 | Chen ...................... G01G 19/50 |
| | | | 250/202 |
| 9,316,475 B2 * | 4/2016 | Liu ........................ A61B 5/1072 |
| 9,389,056 B2 * | 7/2016 | Wood ....................... G01B 3/20 |
| 9,964,400 B1 * | 5/2018 | Jones ..................... G01B 5/061 |
| 10,928,175 B2 * | 2/2021 | Hwang ................ G01B 3/1069 |
| 11,187,514 B2 * | 11/2021 | Li ........................ G01B 3/1069 |
| 12,264,907 B2 * | 4/2025 | Shin ................... G01B 11/0608 |
| 2007/0045011 A1 * | 3/2007 | Dittrich .................. G01G 19/58 |
| | | | 177/148 |
| 2011/0179663 A1 * | 7/2011 | Kang ................... A61B 5/1072 |
| | | | 33/759 |
| 2014/0202017 A1 * | 7/2014 | Wood ....................... G01B 3/20 |
| | | | 33/512 |

(Continued)

*Primary Examiner* — Yaritza Guadalupe-Mccall
(74) *Attorney, Agent, or Firm* — MATTHIAS SCHOLL P.C.; Matthias Scholl

(57) ABSTRACT

A height measurement system includes: a first fixed assembly, configured to connect to an external fixing part so that the height measurement system is fixed on the external fixing part for use; a head plate, configured to move downwards from the first fixed assembly to the head of a user; a second fixed assembly, disposed on the head plate and being movable along with the heat plate; a digital tape measure, comprising a mounting assembly and a tape disposed in the mounting assembly, one of the mounting assembly and the tape head being attached to the first fixing assembly and the other to the second fixing assembly; a memory storing a standard height value of the first fixed assembly; and a data acquisition unit, configured to acquire a first tensile length of the tape when the head plate moves from the first fixed assembly to the user's head.

21 Claims, 14 Drawing Sheets

10

| | | |
|---|---|---|
| First fixed assembly 102 | Digital tape measure 103 | Second fixed assembly 104 |
| Head plate 105 | Memory 114 | Data acquisition unit 115 |
| Data receiving device 116 | Result output device 117 | Information receiving device 118 |

(56)        References Cited

U.S. PATENT DOCUMENTS

| | | | |
|---|---|---|---|
| 2014/0250708 A1* | 9/2014 | Bauer ................. | G01B 3/1061 |
| | | | 33/760 |
| 2019/0183386 A1* | 6/2019 | Johnston .............. | A61B 5/6829 |
| 2025/0035420 A1* | 1/2025 | Shi ....................... | G01B 3/1094 |

* cited by examiner

HEIGHT MEASUREMENT SYSTEM

CROSS-REFERENCE TO RELATED APPLICATIONS

Pursuant to 35 U.S.C. § 119 and the Paris Convention Treaty, this application claims foreign priority to Chinese Patent Application No. 202321996756.7 filed Jul. 27, 2023, and to Chinese Patent Application No. 202311331447.2 filed Oct. 13, 2023. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of height measurement, and more particularly to a height measurement system.

Currently, there are two methods for height measurement: the first is to directly use a tape measure or a height sticker with a scale fixed on a wall to measure height. The method generally estimates the highest point of the head through visual observation, which is prone to data deviation. The second is to use professional height measurement equipment for height measurement, which is commonly used in large medical facilities. However, the professional height measurement equipment is bulky and difficult to carry, so it is not suitable for domestic use.

SUMMARY

The disclosure provides a height measurement system.

In accordance with one embodiment of the disclosure, the height measurement system comprises:

1) a first fixed assembly, configured to connect to an external fixing part so that the height measurement system is fixed on the external fixing part for use;
2) a head plate, configured to move downwards from the first fixed assembly to the head of a user;
3) a second fixed assembly, disposed on the head plate and being movable along with the heat plate;
4) a digital tape measure, comprising a mounting assembly and a tape disposed in the mounting assembly, one of the mounting assembly and the tape head being attached to the first fixing assembly and the other to the second fixing assembly;
5) a memory storing a standard height value of the first fixed assembly connected to the external fixing part; and
6) a data acquisition unit, configured to acquire a first tensile length of the tape when the head plate moves from the first fixed assembly to a top of the user's head, and transmitting the first tensile length to the memory, and the memory being configured to calculate the height of the user according to the standard height value and the first tensile length of the tape.

In a class of this embodiment, the system further comprises a data receiving device configured to receive an actual height value of the first fixed assembly attached to the external fixing part; and the memory is configured to calculate the height of the user according to the actual height value and the first tensile length of the tape.

In a class of this embodiment, the memory is further configured to determine whether the actual height value from the data receiving device is received before calculating the height of the user; if so, the height of the user is calculated based on the actual height value and the first tensile length.

In a class of this embodiment, the system further comprises a data receiving device configured to receive a preset height value of the head plate;

the data acquisition unit is configured to obtain a second tensile length of the tape when the head plate moves from the preset height value to the top of the user's head, and transmit the second tensile length to the memory; and the memory is configured to calculate the height of the user according to the preset height value and the second tensile length of the tape.

In a class of this embodiment, the memory is further configured to determine whether the preset height value from the data receiving device is received before calculating the height of the user, and if so, the height of the user is calculated based on the preset height value and the second tensile length.

In a class of this embodiment, the data acquisition unit is a capacitive gate sensor.

In a class of this embodiment, the capacitive gate sensor is disposed on the mounting assembly.

In a class of this embodiment, the memory is disposed on the mounting assembly or an intelligent terminal independent of the height measurement system.

In a class of this embodiment, the data receiving device disposed on the mounting assembly or an intelligent terminal independent of the height measurement system.

In a class of this embodiment, the system further comprises a result output device; the memory is further configured to transmit the obtained height of the user to the result output device, and the result output device is configured to output the height of the user.

In a class of this embodiment, the system further comprises an information receiving device configured to receive instructions and configuration information;

the memory is further configured to receive the instructions and configuration information from the information receiving device and transmit the instructions and configuration information to the result output device; and the result output device is further configured to output corresponding content according to the instructions and configuration information.

In a class of this embodiment, the result output device is disposed on the mounting assembly and/or an intelligent terminal independent of the height measurement system; and/or the information receiving device is disposed on the mounting assembly and/or an intelligent terminal independent of the height measurement system.

In a class of this embodiment, the memory is also configured to compare the obtained height of the user with a previously obtained height of the user, and/or to compare the obtained height of the user with a standard value.

In a class of this embodiment, the system further comprises a sticky graduation attached to the external fixing part, and the first fixed assembly is disposed on the sticky graduation.

In a class of this embodiment, the mounting assembly is connected to the first fixed assembly; the tape head is connected to the second fixed assembly; the first fixed assembly comprises a paster, a female buckle, a male buckle, and a housing; the paster is connected the external fixing part; the female buckle is fixed on one side of the paster; the male buckle is detachably connected to the female buckle and is disposed on the female buckle; the housing is fixedly connected to the male buckle; the digital tape measure is disposed in the housing.

In a class of this embodiment, the housing comprises a plurality of grooves.

In a class of this embodiment, the mounting assembly is connected to the first fixed assembly, and the tape head is connected to the second fixed assembly; the second fixed assembly comprises a buckle and a limit base fixedly connected to the head plate; the limit base is disposed on the head plate; the buckle is rotatably connected to the head plate, and is detachably connected to the limit base, and is also connected to the tape head.

In a class of this embodiment, the system further comprises a magnetic sheet; the magnetic sheet is disposed on one end of the head plate; and the magnetic sheet is configured to magnetically adsorb the head plate on the external fixing part.

In a class of this embodiment, the mounting assembly is connected to the first fixed assembly, and the tape head is connected to the second fixed assembly;

the second fixed assembly comprises a connection base and a connection column; the connection base is fixedly connected to the head plate and is disposed on the head plate; the connection column is connected to the tape head and is detachably connected to the connection base, and is disposed on the connection base.

In a class of this embodiment, the mounting assembly is connected to the first fixed assembly, and the tape head is connected to the second fixed assembly;

the second fixed assembly comprises a magnetic block and a fastener; the magnetic block is connected to the tape head and is connected to the head plate, and is disposed on the tape head; the fastener is fixedly connected to the head plate and is disposed on the head plate.

In a class of this embodiment, the system further comprises a magnetic sticker; the magnetic sticker is connected to the paster and is disposed on one side of the paster away from the female buckle.

The components of the height measurement system are small in size, occupying little space, and some components are connected in a detachable way, which is easy to store and carry. The height of the users is calculated by the memory, the result is objective, accurate, and intelligent.

Figure 1:
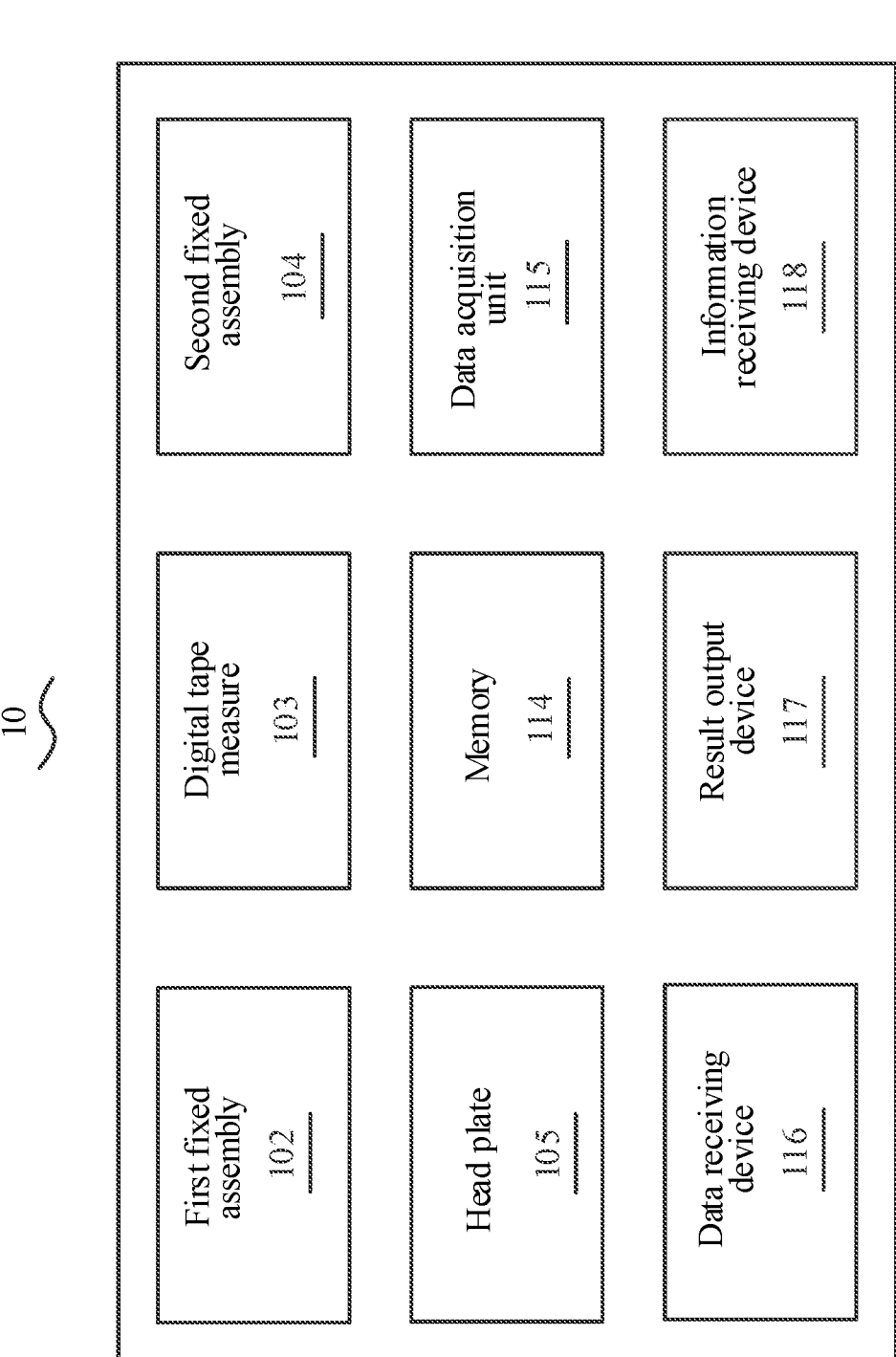
FIG. 1 is a block diagram of a height measurement system in accordance with Example 1 of the disclosure.

In the drawings, the following reference numbers are used: 10. Height measurement system; 101. Sticky graduation; 102. First fixed assembly; 103. Digital tape measure; 104. Second fixed assembly; 105. Head plate; 106. Paster; 107. Female buckle; 108. Male buckle; 109. Housing 110. Groove; 111. Tape; 111a. Tape head; 112. Mobile terminal; 113. Mounting assembly; 114. Memory; 115. Data acquisition unit; 116. Data receiving device; 117. Result output device; 118. Information receiving device; 201. Buckle; 202. Limit base; 203. Magnetic sheet; 301. Connection base; 302. Connection column; 401. Magnetic block; 402. Fastener; 501. Magnetic sticker.

DETAILED DESCRIPTION

To further illustrate the disclosure, embodiments detailing a height measurement system are described below. It should be noted that the following embodiments are intended to describe and not to limit the disclosure.

Example 1

Figure 2:
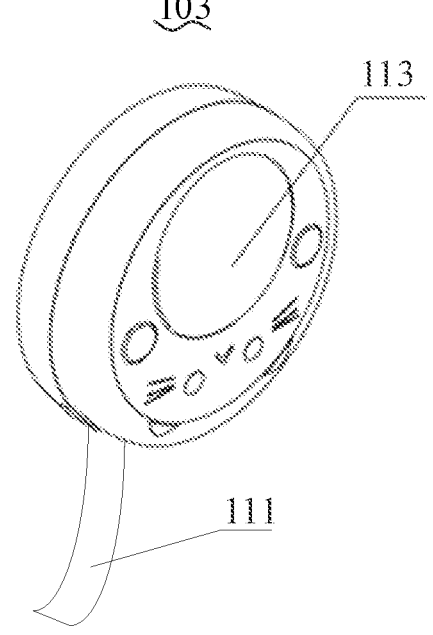
FIG. 2 is a schematic diagram of a digital tape measure in Example 1 of the disclosure.
Figure 3:
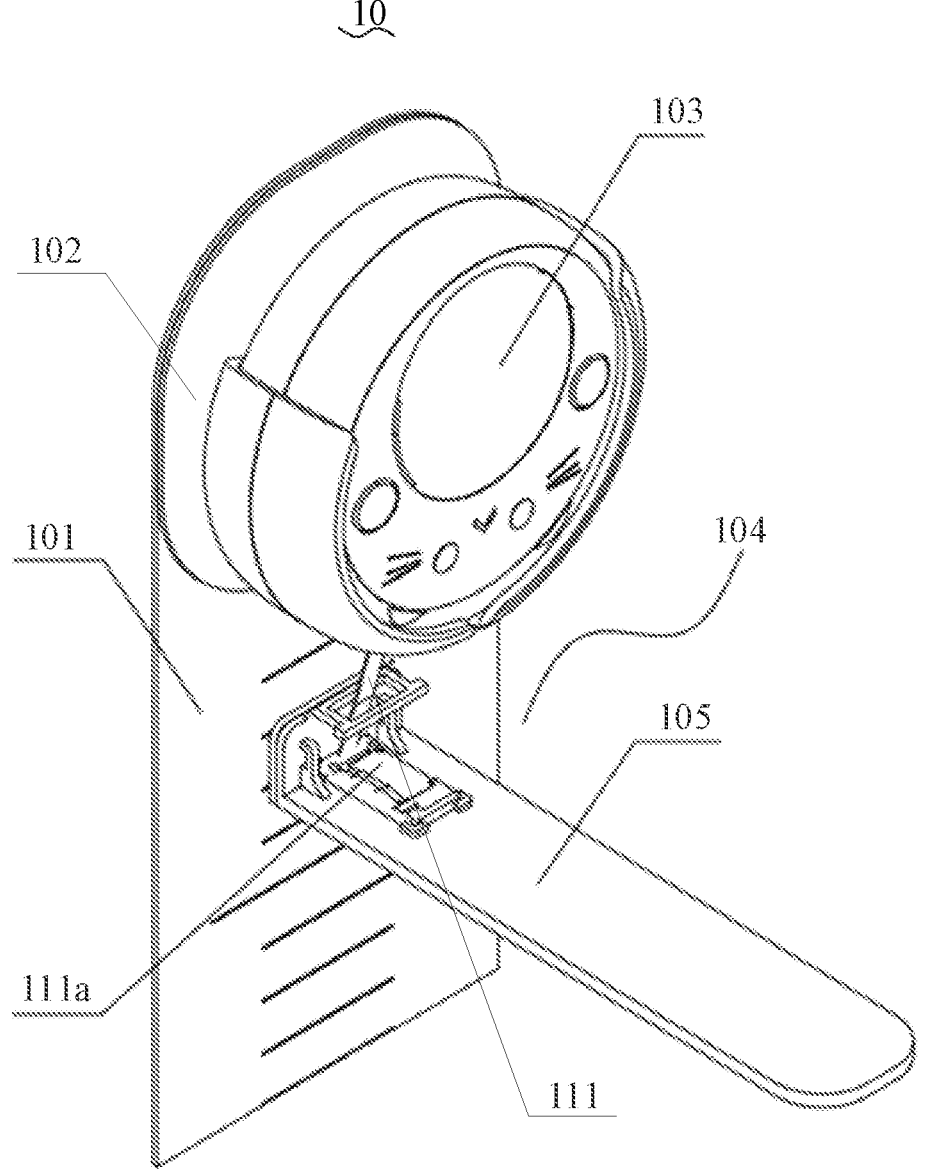
FIG. 3 is a schematic diagram of a height measurement system in Example 2 of the disclosure.

As shown in FIGS. 1 and 2, FIG. 1 is a block diagram of a height measurement system of the disclosure; and FIG. 2 is a schematic diagram of a digital tape measure of the disclosure.

The height measurement system 10 comprises a head plate 105, a first fixed assembly 102, a second fixed assembly 104, and a digital tape measure 103. The first fixed assembly 102 is configured to connect to an external fixing part independent of the height measurement system 10 so that the height measurement system is fixed on the external fixing part for use. The head plate 105 is configured to move downwards from the first fixed assembly 102 to the top of the user's head under the action of external force. The second fixed assembly 104 is disposed on the head plate 105 and moves with the movement of the head plate 105. The digital tape measure 103 comprises a mounting assembly 113 and a tape 111 disposed in the mounting assembly 113. One of the mounting assembly 113 and the tape head 111a is attached to the first fixing assembly 102, and the other is connected to the second fixed assembly 104. After the height measurement system 10 is disposed on the fixing part, the first fixed assembly 102 is connected to the fixing part at a height greater than the height of the user. By moving the head plate 105 downwards, that is, towards the ground, the head plate 105 can be moved to the top of the user's head. The height measurement system 10 of the example has a smaller volume and occupies less space, and multiple components are connected to each other in a detachable way, so it is easy to store and carry.

Specifically, that one of the mounting assembly 113 and the tape head 111a is attached to the first fixing assembly 102, and the other is connected to the second fixed assembly 104 refers to the following two modes: first, the mounting assembly 113 is connected to the first fixed assembly 102, and the tape head 111a is connected to the second fixed assembly 104; second, the mounting assembly 113 is connected to the second fixed assembly 104 and the tape head 111a is connected to the first fixed assembly 102. When the first installation method is adopted, the tape head 111a moves with the head plate 105; when the second installation method is adopted, the tape head 111a is fixed, and the mounting assembly 113 and the tape 111 inside the mounting assembly 113 move with the head plate 105.

As an implementation mode, the fixing part is a wall, a door, etc.

As an implementation mode, the height measurement system 10 also includes a memory 114 and a data acquisition unit 115; the memory 114 stores the standard height value H1 of the first fixed assembly 102 connected to the fixing part. The data acquisition unit 115 is used to obtain the first tensile length L1 of the tape 111 when the head plate 105 moves from the first fixed assembly 102 to the top of the user's head, and transmit the first tensile length L1 to the memory 114. The memory 114 is configured to calculate the height T of the user based on the standard height value H1 and the first tensile length L1, i.e. T=H1−L1. In this way, the height measurement system 10 can directly obtain the height of the user. The height of the user is calculated through the memory 114, and the result is objective, accurate, and intelligent.

For example, if the standard height value H1 is set to 180 cm, and the first tensile length L1 obtained by the data acquisition unit 115 is 10 cm, the memory can calculate the height of the user based on the stored standard height value H1 180 cm, that is, 180 cm−10 cm=170 cm.

In another implementation, the height measurement system 10 also includes a data receiving device 116, which is used to receive the actual height value H2 of the first fixed assembly 102 connected to the fixing part. The memory 114 is also configured to calculate the height of the user based on the actual height value H2 and the first tensile length L1. In this way, the error caused by the difference between the actual height and the standard height of the measured value can be eliminated.

For example, if the standard height value H1 is set to 180 cm, and the actual height value H2 of the first fixed assembly 102 connected to the fixing part is 185 cm. The first tensile length L1 obtained by the data acquisition unit 115 is 10 cm, and the user inputs the actual height value H2 185 cm into the data receiving device 116; the data receiving device 116 transmits the actual height value H2185 cm to the memory, which calculates based on the received actual height value H2 185 cm, i.e. 185 cm−10 cm=175 cm. Optionally, the user can obtain the actual height value H2 of the first fixed assembly 102 through any method such as steel tape measure, tape measure, or sticky graduation 101.

In this implementation, the memory 114 is further configured to determine whether the actual height value from the data receiving device 116 is received before calculating the height of the user, and if so, calculate the height of the user based on the actual height value and the first tensile length. That is, when the user inputs the actual height value, the memory prioritizes calculating the height of the user based on the actual height value and the first tensile length, thus ensuring the height of the user is calculated accurately.

In another embodiment, the height measurement system 10 further comprises a data receiving device 116. The data receiving device 116 is configured to receive a preset height value H3 of the head plate 105; the data acquisition unit 115 is configured to obtain a second tensile length L2 of the tape 111 when the head plate 105 moves from the preset height to the top of the head of the user, and to transmit the second tensile length L2 to the memory 114; the memory 114 is also configured to calculate the height of the user based on the preset height value H3 and the second tensile length L2. The preset height value H3 is a preset height to which the head plate 105 is moved downwardly by the user during the height measurement. In this way, the error caused by the difference between the actual height and the standard height of the measured value can be eliminated.

For example, the standard height value H1 is set to 180 cm; the actual height value H2 of the first fixed assembly 102 connected to the fixing part is 185 cm; the user moves the head plate 105 downward to a preset height value H3 of 170 cm, and the data acquisition device 115 acquires the second tensile length L2 of 10 cm. The user inputs the preset height value H3 170 cm into the data receiving device 116, and the data receiving device 116 transmits the preset height value H3 170 cm to the memory. The memory calculates the height of the user based on the received preset height value H3 of 170 cm and the second tensile length L2 of 10 cm, i.e., 170 cm−10 cm=160 cm. Optionally, the user may obtain the preset height value H3 170 cm of the head plate 105 by any means such as steel tape measure, leather ruler, or a sticky graduation 101.

In this embodiment, the memory 114 is further configured to determine whether a preset height value from the data receiving device 116 has been received before calculating the height of the user, and if so, calculate the height of the user based on the preset height value and the second tensile length. That is, when the user inputs the preset height value, the memory prioritizes calculating the height of the user based on the preset height value and the second tensile length, thus ensuring that the calculated height of the user is accurate.

As an embodiment, the data acquisition unit 115 is a capacitive gate sensor. The use of the capacitive gate sensor to obtain the tensile length of the tape 111 is prior art and will not be described in detail herein.

As an implementation, the capacitive gate sensor is disposed on the mounting assembly 113. In specific applications, when the mounting assembly 113 is connected to the first fixed assembly 102, the capacitive gate sensor is disposed on the first fixed assembly 102; when the mounting assembly 113 is connected to the second fixed assembly 104, the capacitive gate sensor is disposed on the second fixed assembly 104.

As an implementation, the memory is disposed on the mounting assembly 113 or an intelligent terminal independent of the height measurement system 10. That is to say, the memory can be integrated into the digital tape measure 103 or into the intelligent terminal. When the memory is integrated into the digital tape measure 103, the height of the user is calculated using the digital tape measure 103; when the memory is integrated into the intelligent terminal, the height of the user is calculated by the intelligent terminal.

Optionally, the intelligent terminal includes but is not limited to mobile phones, tablets, computers, etc.

As an implementation, the data receiving device 116 is disposed on the mounting assembly 113 or an intelligent terminal independent of the height measurement system 10. That is to say, the data receiving device 116 may be integrated into the digital tape measure 103 or into an intelligent terminal. When the data receiving device 116 is integrated into the digital tape measure 103, the user can input the actual height value of the first fixed assembly 102 or the preset height value of the head plate 105 via the digital tape measure 103; when the memory is integrated into the intelligent terminal, the user can input the actual height value of the first fixed assembly 102 or the preset height value of the head plate 105 through the intelligent terminal.

As an embodiment, the height measurement system 10 further comprises a result output device 117; the memory 114 is further configured to transmit the obtained height of the user to the result output device 117. The result output device 117 is used to output the height of the user. In this way, the measurement results can be easily obtained by the user. In addition, the result output device 117 can store and record the results of each measurement so that the growth trends of the user can be recorded and data can be analyzed.

As an embodiment, the result output device 117 is a display device or a voice prompting device. When the result output device 117 is a display device, the user can obtain the measurement results with his/her eyes; when the result output device 117 is a voice prompting device, the user can listen to the measurement results with his/her ears.

As an implementation, the result output device 117 is disposed on the mounting assembly 113 and/or an intelligent terminal independent of the height measurement system 10. That is, the result output device 117 can be disposed on the mounting assembly 113 (i.e., the result output device 117 is integrated into the digital tape measure 103), or the intelligent terminal is provided with the result output device 117 (i.e., the result output device 117 is integrated into the intelligent terminal). The result output device 117 can be disposed on both the mounting assembly 113 and the intelligent terminal. When the result output device 117 is disposed on the mounting assembly 113, the digital tape measure 103 outputs the measurement results; when the result output device 117 is disposed in the intelligent terminal, the intelligent terminal outputs the measurement result. When the result output device 117 is disposed on both the mounting assembly 113 and the intelligent terminal, both the digital tape measure 103 and the intelligent terminal can output the measurement results.

As an implementation, the information receiving device 118 is disposed on the mounting assembly 113 and/or an intelligent terminal independent of the height measurement system 10.

In other words, the information receiving device 118 is disposed in the mounting assembly 113 (i.e., the information receiving device 118 is integrated into the digital tape measure 103), or the information receiving device 118 is disposed in the intelligent terminal (i.e., the information receiving device 118 is integrated into the intelligent terminal). Furthermore, the information receiving device 118 can be disposed in both the mounting assembly 113 and the intelligent terminal. When the information receiving device 118 is disposed in the mounting assembly 113, commands and instructions can be input directly to the digital tape measure 103. When the information receiving device 118 is disposed in the intelligent terminal, the instructions and configuration information can be input through the intelligent terminal; when the information receiving device 118 is disposed in both the mounting assembly 113 and the intelligent terminal, the commands and configuration information can be input either through the digital tape measure 103 or through the intelligent terminal.

As an implementation, the data receiving device 116 and the information receiving device 118 may be the same device.

As an embodiment, the memory 114 is further configured to: compare the obtained height value of the user with a previously obtained height value. In this way, the user can know the height change, which improves the user experience.

As an embodiment, the memory 114 is further configured to: compare the obtained height value of the user with a standard height value. In this way, the user knows whether the current height is normal or not. Optionally, the standard height value may be a standard for the age and height of an adolescent.

Optionally, the functions of the digital tape measure 103 can be configured according to the result output device 117 for outputting one or more selected functions for displaying the measurement results as needed, and the functions for configuration include at least one of the following groups: units (cm/in), resolution, voice (male/female voice, etc.), a language category (Chinese/English, etc.), setting a height standard, storing current data, and calibration of the tape measure.

According to the disclosure, the digital tape measure 103 is configured for use by different groups of users, not only through the inputting means such as buttons on the digital tape measure, but also through the interaction between a communication interface with the result output device.

For example, the user determines the function to be applied by the circuit unit of the digital tape measure by setting the function that controls the measurement data, such as the display setting indicated by cm or in. Upon completion of this configuration, the communication between the intelligent terminal and the digital tape measure may be terminated. The digital tape measure then displays the measurement results in cm according to the display unit. In other words, before the digital tape measure is used for the measurement operation or the display device, these operations or functions can be set by the user using the intelligent terminal (in this case, the information receiving device 118 is located at the intelligent terminal).

For example, the users can set the age of the tester on the information receiving device 118. The information receiving device 118 store the standard height values of that age (such as standard height, −2 SD height, −1 SD body height, +1 SD height, +2 SD height) in the memory of the digital tape measure through the communication interface. After completing this configuration, the communication between the information receiving device 118 and the digital tape measure is terminated. After the measurement, the height measurement system automatically compares the height test value with the standard value in the memory to determine whether the tester's height meets the standard (the result can be shown through voice prompts or LCD display).

As an embodiment, the digital tape measure 103 is also integrated with a wireless module. The wireless module is at least capable of wirelessly transmitting the data information within the digital tape measure 103 to an intelligent terminal, such as: the data obtained by a data acquisition unit 115, the obtained height value of the user calculated by the memory integrated within the digital tape measure 103. Understandably, in other embodiments, it is also possible that the digital tape measure 103 is not integrated with a wireless module, and the data transmission can be carried out via a data cable.

The height measurement of the disclosure is specifically performed in the following manner:

1) When both the memory and the data receiving device 116 are integrated in the digital tape measure 103, the digital tape measure 103 receives the input information of the user and calculates to obtain the height of the user;

2) When both the memory and the data receiving device 116 are integrated in the intelligent terminal, the intelligent terminal receives the input information of the user and the information of the data acquisition unit 115, and then calculates to obtain the height of the user;

(3) When the memory is integrated in the digital tape measure 103 and the data receiving device 116 is integrated in the intelligent terminal, the intelligent terminal receives the input information of the user and transmits it to the digital tape measure 103, and then the digital tape measure 103 calculates the height of the user;

(4) When the data receiving device 116 is integrated into the digital tape measure 103 and the memory is integrated into the intelligent terminal, the digital tape measure 103 receives the input information of the user and transmits it to the intelligent terminal, and at the same time transmits the information obtained by the data acquisition unit 115 to the intelligent terminal, the intelligent terminal calculates the height of the user.

Example 2

Figure 4:
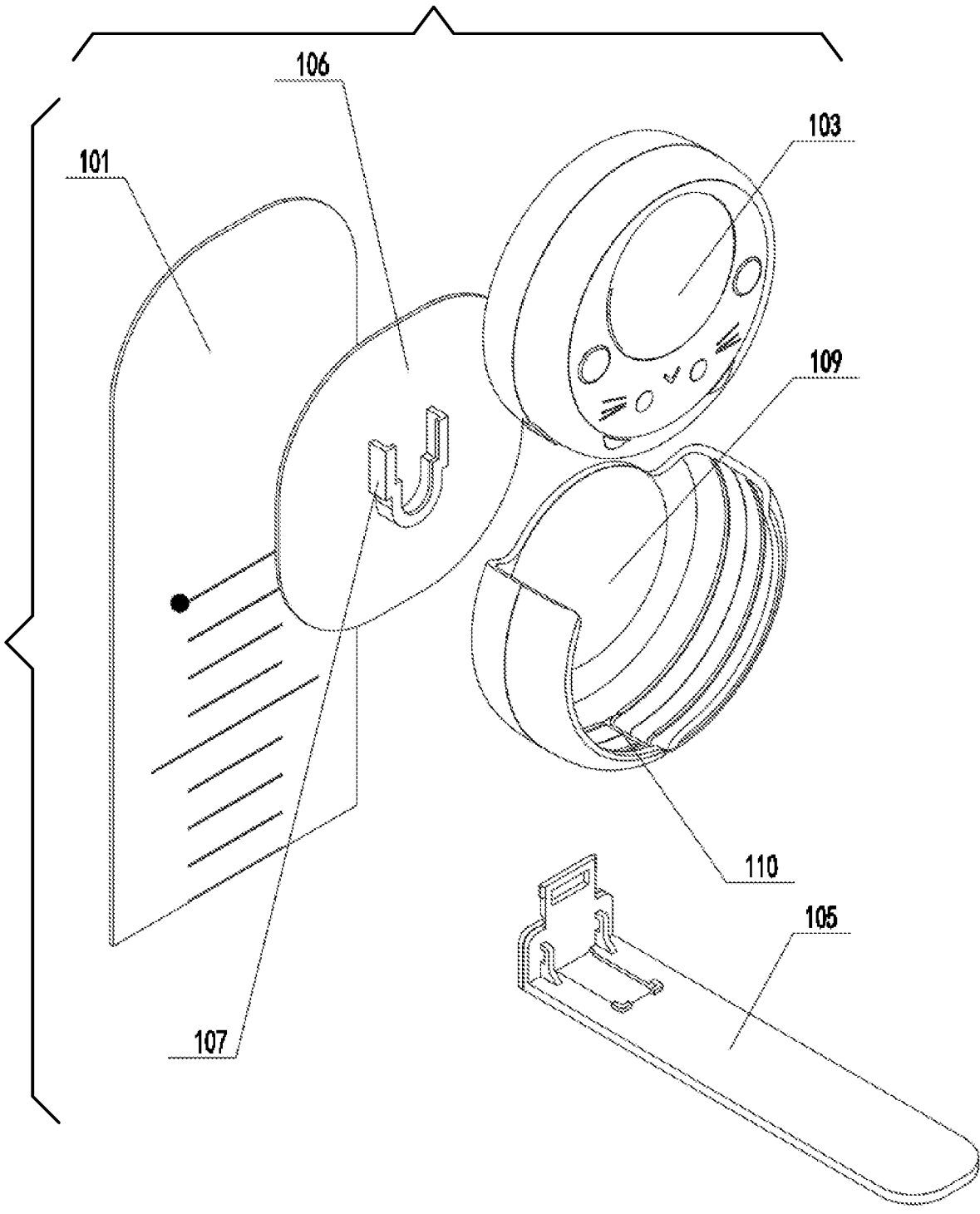
FIG. 4 is an exploded view of a height measurement system in Example 2 of the disclosure.
Figure 5:
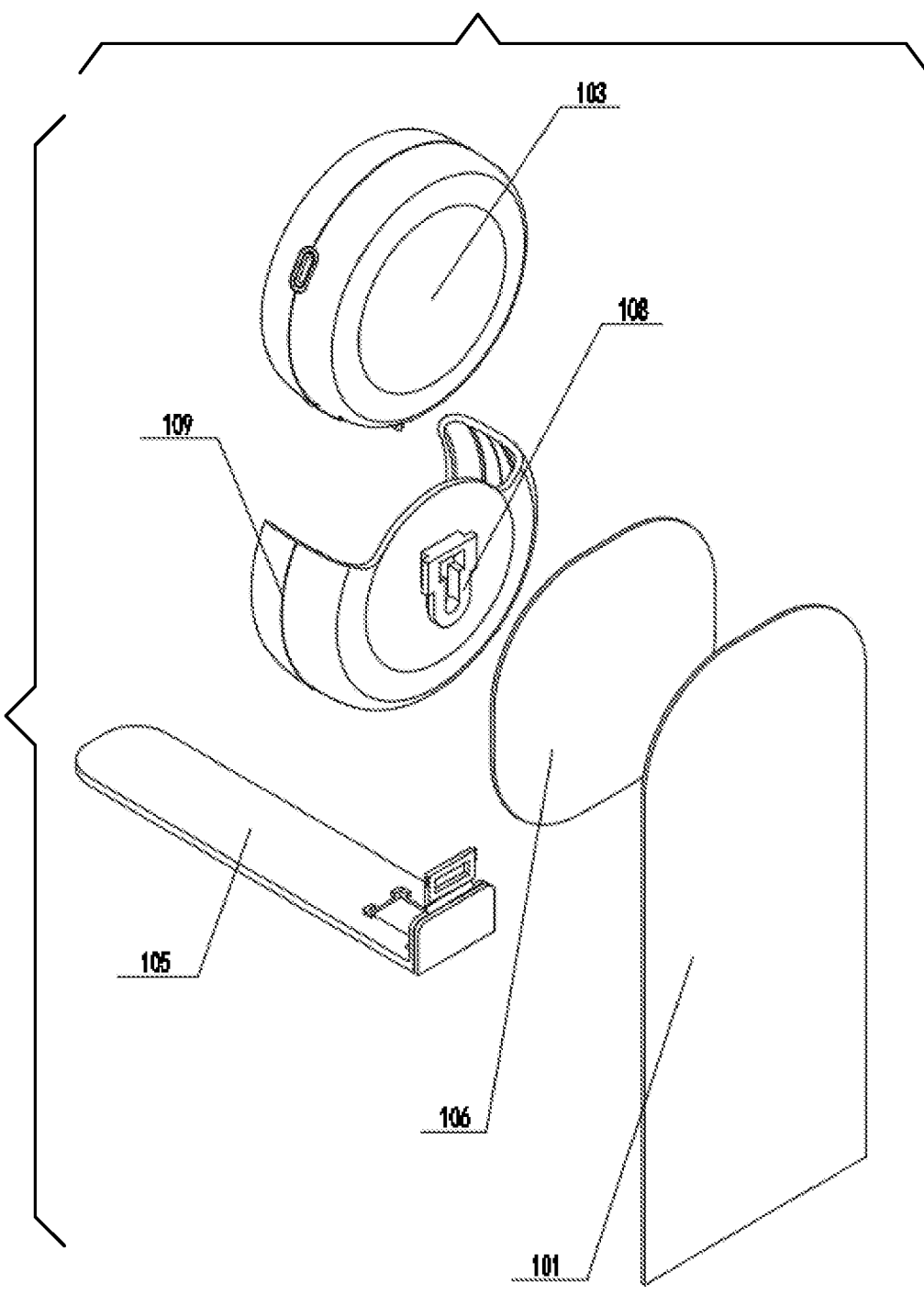
FIG. 5 is another exploded view of a height measurement system in Example 2 of the disclosure.
Figure 6:
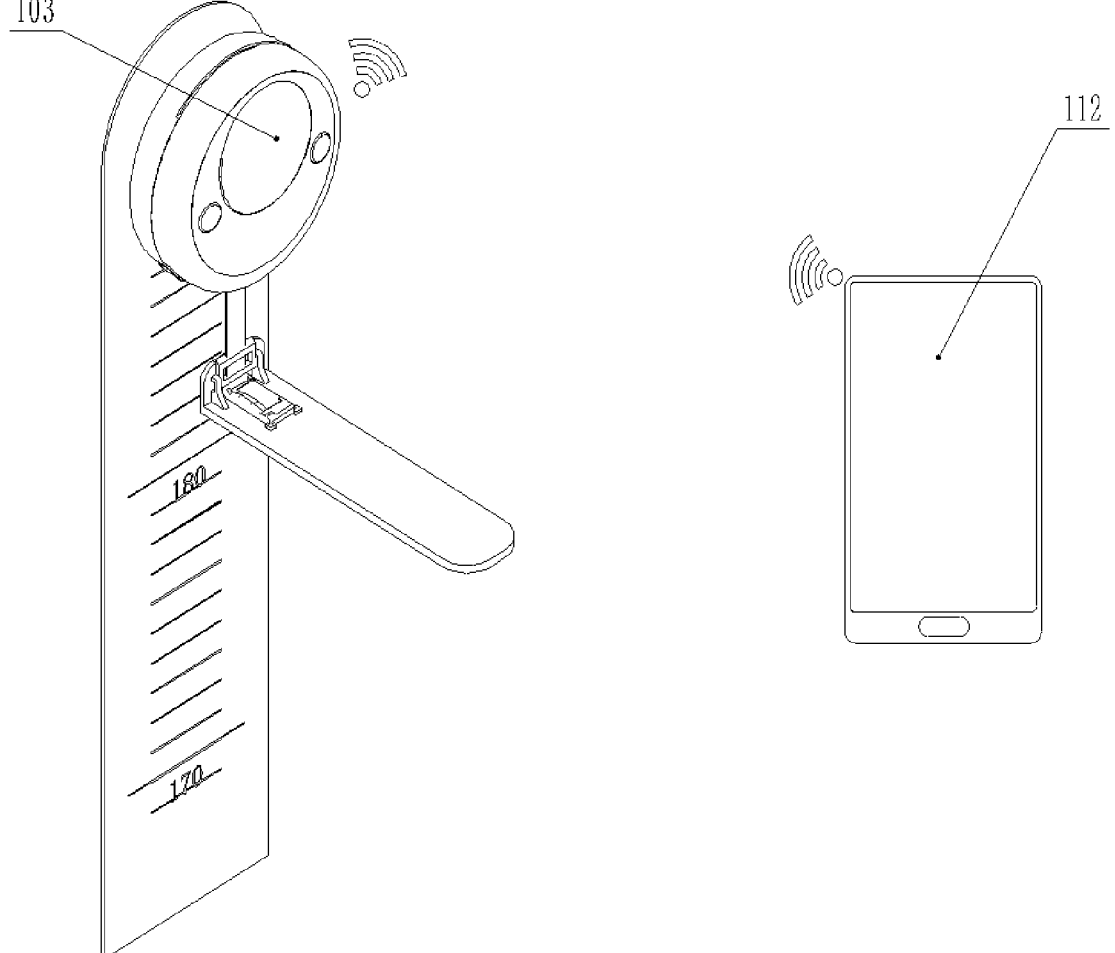
FIG. 6 is a wireless communication diagram of a height measurement system in Example 2 of the disclosure.
Figure 7:
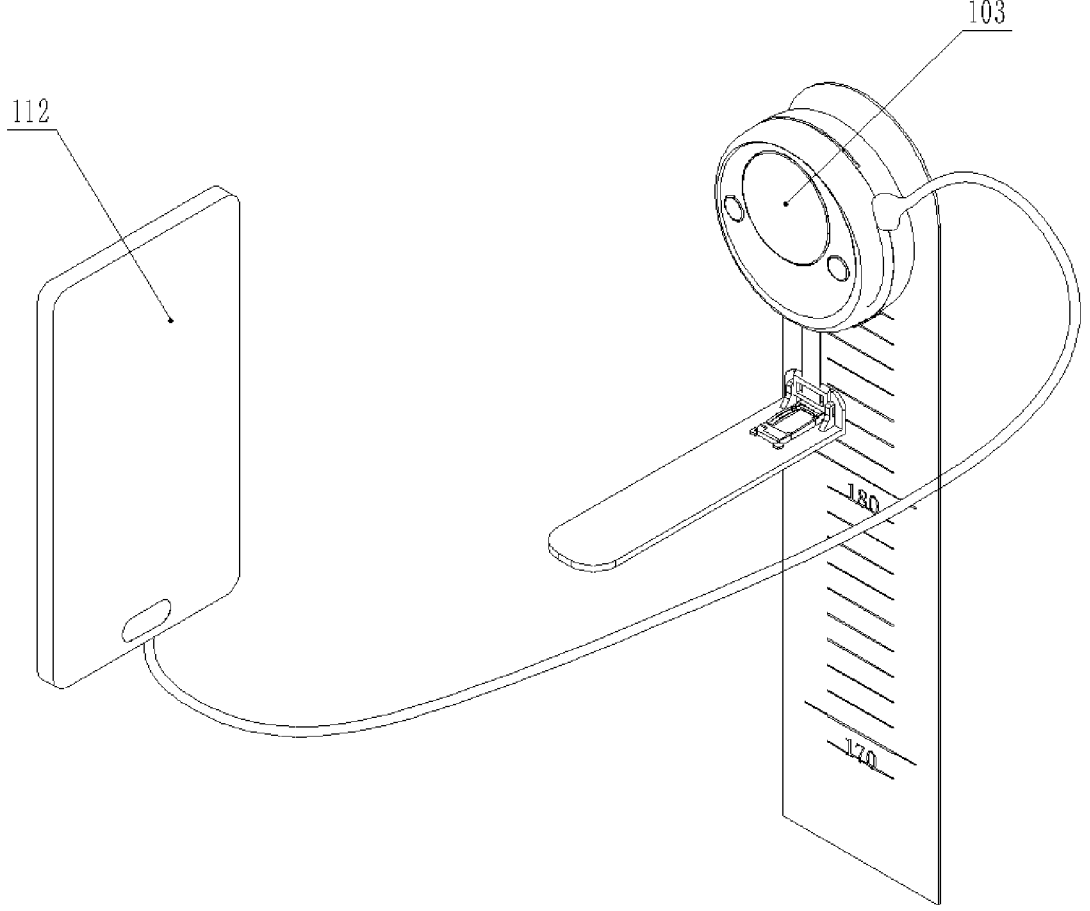
FIG. 7 is a wired communication diagram of a height measurement system in Example 2 of the disclosure.

As shown in FIGS. 3-7, FIG. 3 is a schematic diagram of a height measurement system of the disclosure; FIG. 4 is an exploded view of a height measurement system of the disclosure; FIG. 5 is another exploded view of a height measurement system of the disclosure; FIG. 6 is a wireless communication diagram of a height measurement system of the disclosure; FIG. 7 is a wired communication diagram of a height measurement system of the disclosure.

The height measurement system of the disclosure comprises a sticky graduation 101, a first fixed assembly 102, a digital tape measure 103, a second fixed assembly 104, a head plate 105 and a mobile terminal 112. The first fixed assembly 102 comprises a paster 106, a female buckle 107, a male buckle 108 and a housing 109. The housing 109 comprises a plurality of grooves 110. The sticky graduation 101 is affixed to a fixed part (e.g. a flat surface such as a wall, etc.) by means of gluing or bolting. The head plate 105 is pulled downwards to touch the top of the head of a user, which can enhance the accuracy of the measurement, and at the same time reduce the overall size of the device, thus being convenient for home use. The digital tape measure 103 can be disassembled for storage after use.

In specific applications, it is also possible not to set the sticky graduation 101, when no sticky graduation 101 is disposed, the measurements can be made by a steel tape measure or a leather ruler, etc.

The digital tape measure 103 is connected to the sticky graduation 101 through the first fixed assembly 102. The second fixed assembly 104 is disposed on the tape head 111a of the tape 111. The head plate 105 is connected to the tape head 111a through the second fixed assembly 104. The digital tape measure 103 is detachably connected to the sticky graduation 101 through the first fixed assembly 102. The digital tape measure 103 comprises a mounting assembly 113 and the tape 111. The sticky graduation 101 may be provided with a back adhesive. The sticky graduation 101 is fixed on the wall surface through the adhesive effect of the back adhesive. The sticky graduation 101 can also be provided with a screw hole, which can be used for fixing the sticky graduation on the wall surface. The head plate 105 is a right-angled structure, and one right-angled surface is tightened to the wall surface and one right-angled surface is tightened to the top of the head during the measuring process. This structure facilitates the positioning of the measurement and improves the accuracy of the height measurement. Before measurement, press the button of the digital tape measure 103, the working mode of the digital tape measure can be changed to height measurement mode. After resetting, the digital tape measure 103 will display the preset initial value, and the digital tape measure 103 will be mounted and fixed by the first fixed assembly 102 during measurement. After the fixing operation, the tape head 111a is driven by pulling the head plate 105, and the height reading can be directly displayed on the digital tape measure 103. When the height data is steadily displayed for more than a certain time (e.g. 3 s), the digital tape measure can transmit the data to the mobile terminal 112 through the wireless module built into the digital tape measure, and the mobile terminal 112 completes the analysis, processing and collection of the data. After the measurement, take down the digital tape measure 103 for storage, and switch the digital tape measure 103 to its original mode.

The paster 106 is attached to the sticky graduation 101 and is located on one side of the sticky graduation 101; the female buckle 107 is fixedly attached to the paster 106 and located on the side of the paster 106 away from the sticky graduation 101; the male buckle 108 is detachably connected to the female buckle 107 and is disposed on the female buckle 107; the housing 109 is fixedly connected to the male buckle 108 and is connected to the digital tape measure 103, and is disposed on the male buckle 108.

The grooves are disposed on and through the housing 109.

The sticky graduation 101 is printed with an installation reference line. During installation, align the lower edge of the paster 106 with the installation reference line on the sticky graduation 101. The installation methods of the sticky graduation 101 include but are not limited to using back stickers, nails fixation, and self-adhesive pasting.

The opening of the female buckle 107 is facing upwards, and the housing 109 is installed on the sticky graduation 101 through the insertion of the female buckle. The tape 111 of the digital tape measure 103 is placed in the housing 109 with the outlet facing downwards, and the groove 110 is disposed below the housing 109. The tape 111 of the digital tape measure 103 can be stretched downwards from the groove 110. The first fixed assembly 102 can be without the housing 109, and the male buckle 108 can be directly fixed on the back of the tape. Thus, the digital tape measure 103 is fixed on the wall surface through the female buckle 107 with a vertical downward outlet.

With regard to the height measurement system of the disclosure, the digital tape measure 103 can be placed and fixed in the housing 109 with the head facing downwards. At the same time, the tape 111 is pulled out of the groove 110 and the tape head 111a is fixed above the head plate 105, and one end of the head plate 105 is tightly pressed against the wall, the other end contact closely to the top of the head of the user, thus improving the measurement accuracy and reducing the occupied area.

Example 3

Figure 8:
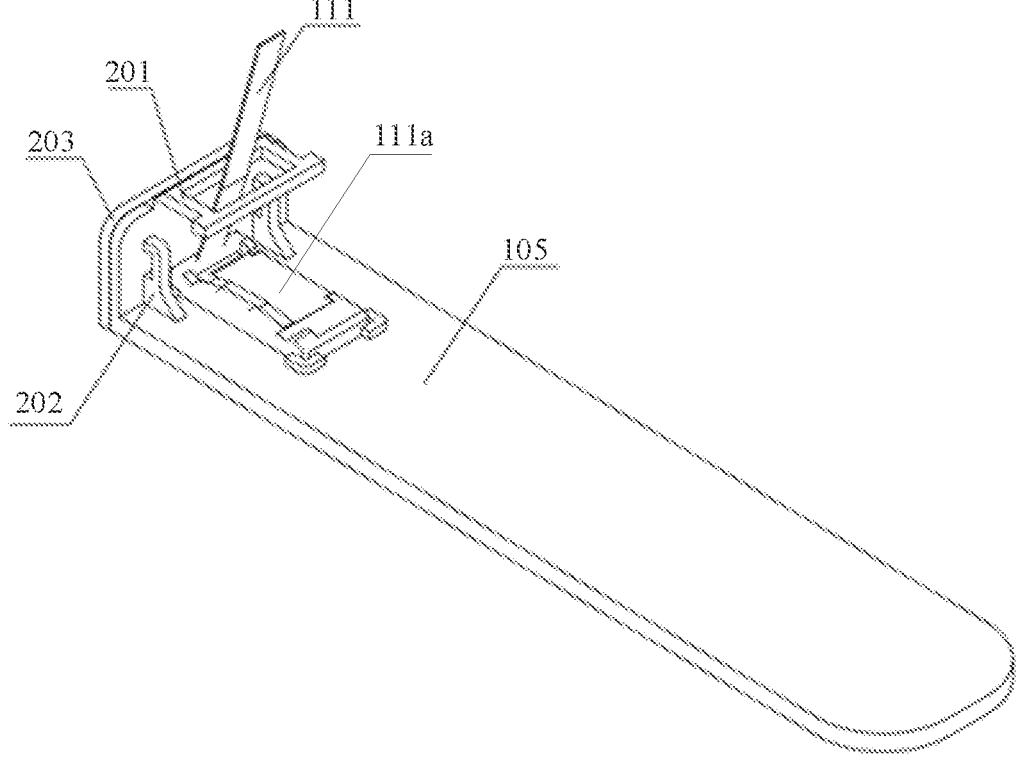
FIG. 8 is a schematic diagram of a buckle in Example 3 of the disclosure.
Figure 9:
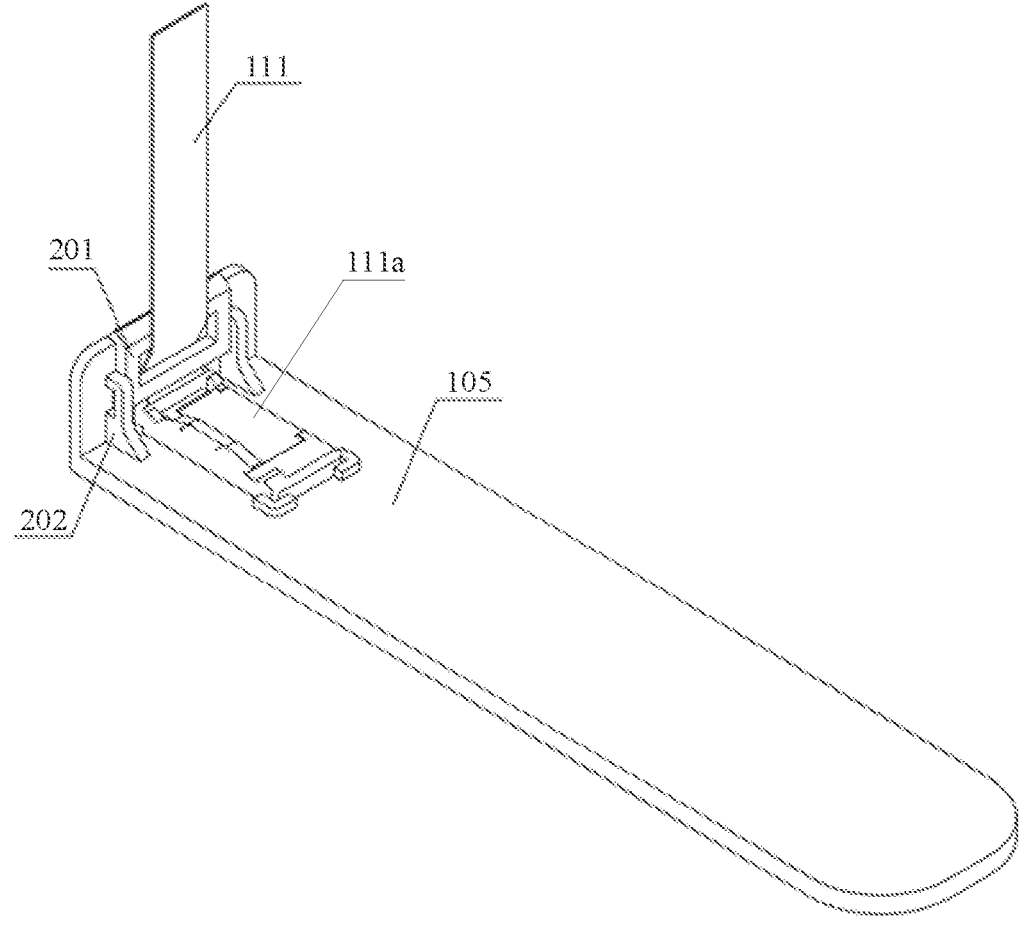
FIG. 9 is a schematic diagram of the locking of a buckle and a limit base in Example 3 of the disclosure.

Based on Example 2, as shown in FIGS. 8 and 9, FIG. 8 is a schematic diagram of a buckle of the disclosure. FIG. 9 is a schematic diagram of the locking of a buckle and a limit base of the disclosure. In this example, the second fixed assembly 104 comprises a buckle 201, a limit base 202 and a magnetic sheet 203.

As an implementation, the limit base 202 is fixedly connected to the heat plate 105, and is disposed on the head plate 105. The buckle 201 is rotatably connected to the head plate 105, and is detachably connected to the limit base 202. The buckle is also connected to the tape head 111*a*. The buckle 201 comprises a rectangular hole, and during fixing operation, the tape head 111*a* passes through the hole on the buckle 201, and inserts into the groove below the head plate 105. The buckle 201 is fastened with the limit base 202 to press the tape head 111*a* tightly. If the head is to be replaced, only the groove on the head plate 105 that matches the tape head 111*a* is changed.

Specifically, the magnetic sheet 203 is fixedly connected to the head plate 105 and is located on the side of the head plate 105 close to the sticky graduation 101. The magnetic sheet 203 can be attached to the sticky graduation 101, facilitating the fixation of the head plate 105 during measurement, eliminating the need to manually fix the head plate 105

Example 4

Figure 10:
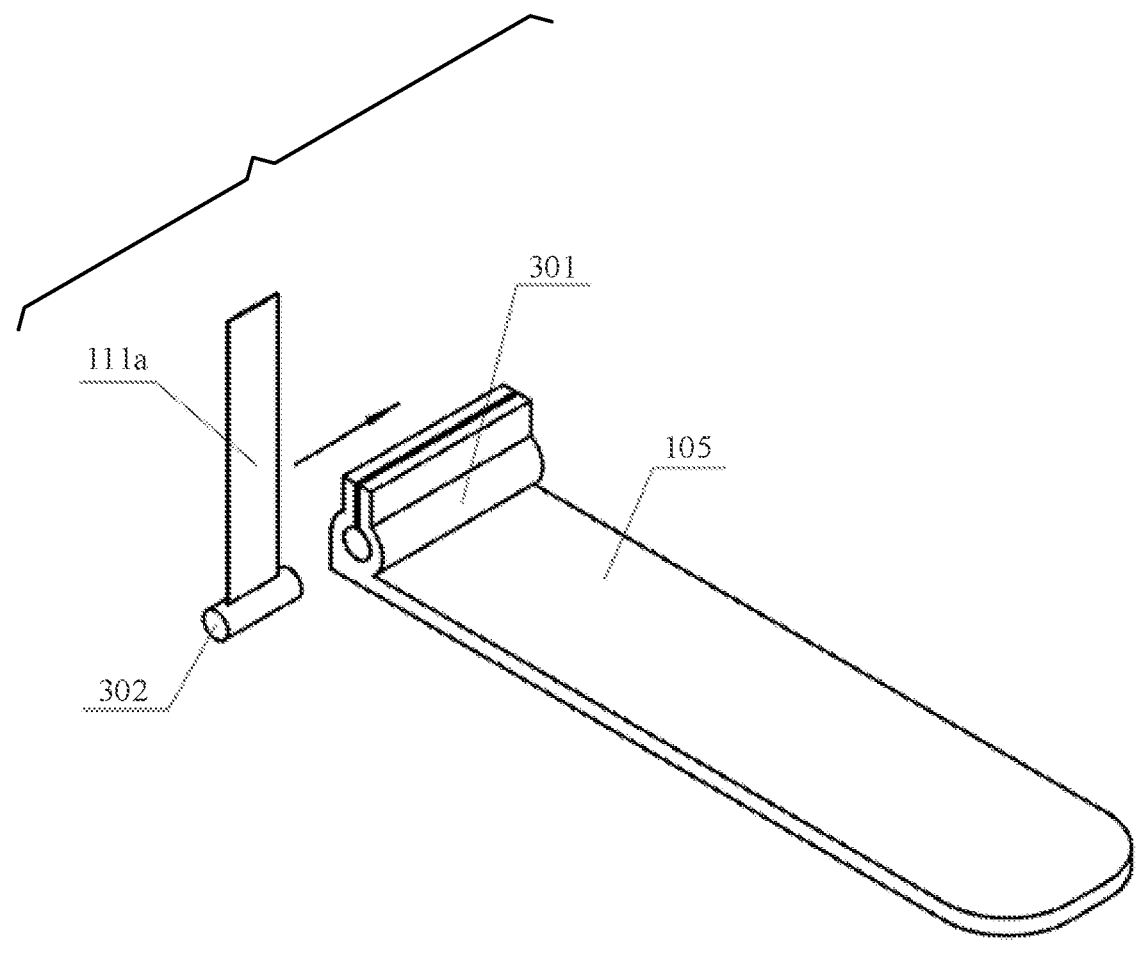
FIG. 10 is a schematic diagram of a connection column in Example 4 of the disclosure.
Figure 11:
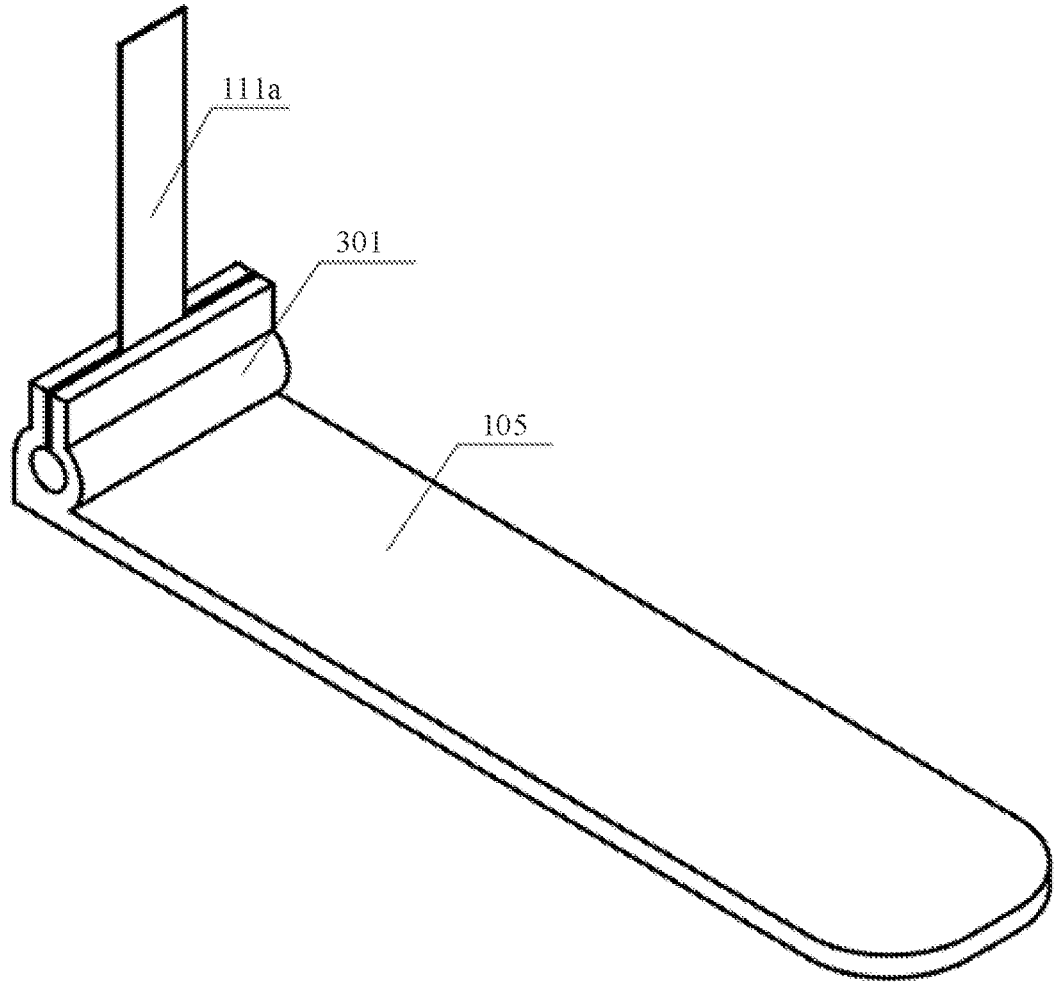
FIG. 11 is a schematic diagram of the locking of a connection column and a connection base in Example 4 of the disclosure.

Based on Example 2, as shown in FIG. 10 and FIG. 11, FIG. 10 is a schematic diagram of a connection column in Example 4 of the disclosure. FIG. 11 is a schematic diagram of the locking of a connection column and a connection base in Example 4 of the disclosure. The second fixed assembly 104 of the disclosure comprises a connection base 301 and a connection column 302.

The connection base 301 is fixedly connected to the head plate 105 and is disposed on the head plate 105; the connection column 302 is connected to the tape head 111*a*, and is detachably connected to the connection base 301. The connection base 301 comprises a slot for fixing the connection column 302. During fixing operations, the connection column 302 is inserted into the slot from one side to complete the fixation of the tape head 111*a*.

Example 5

Figure 12:
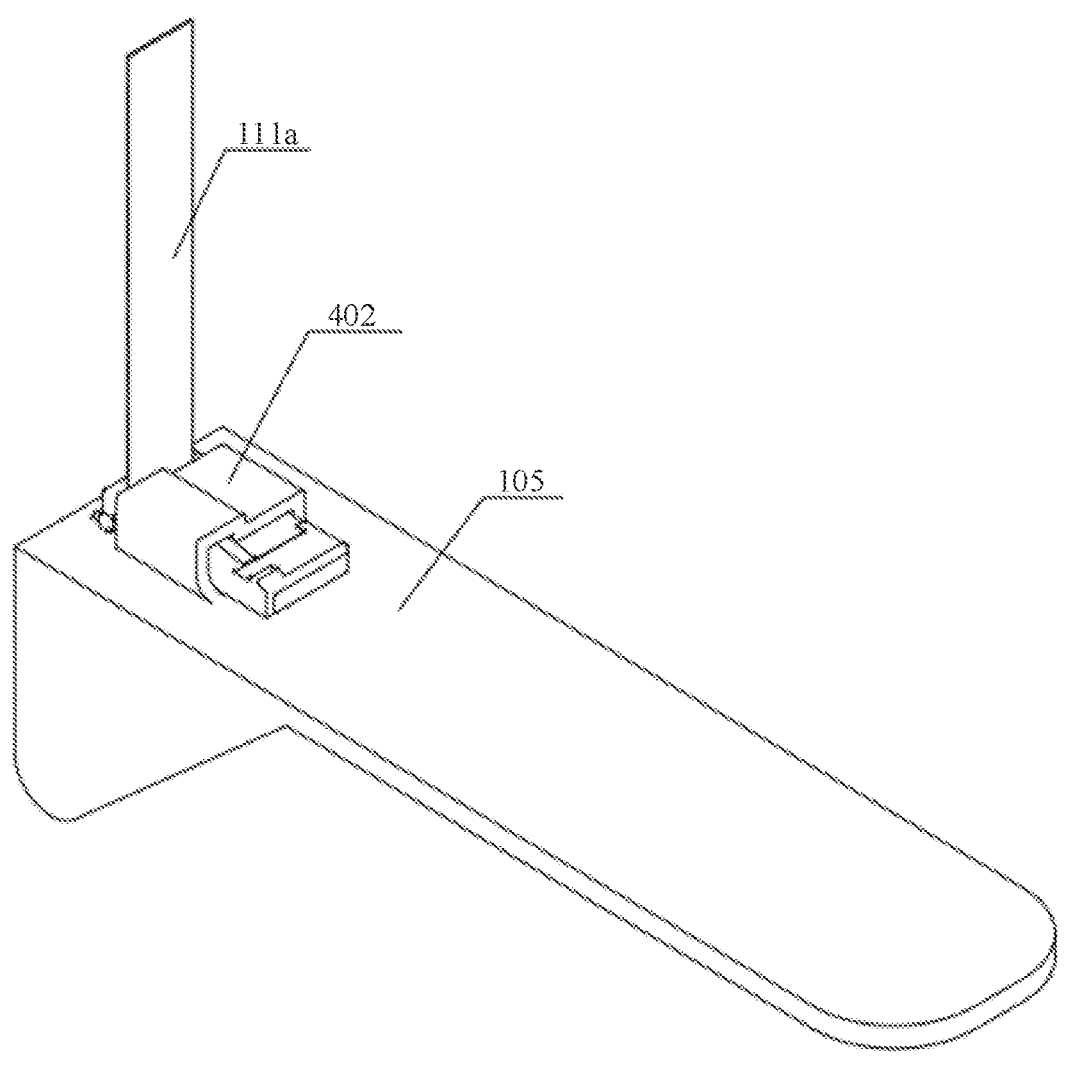
FIG. 12 is a mounting diagram of a fastener in Example 5 of the disclosure.
Figure 13:
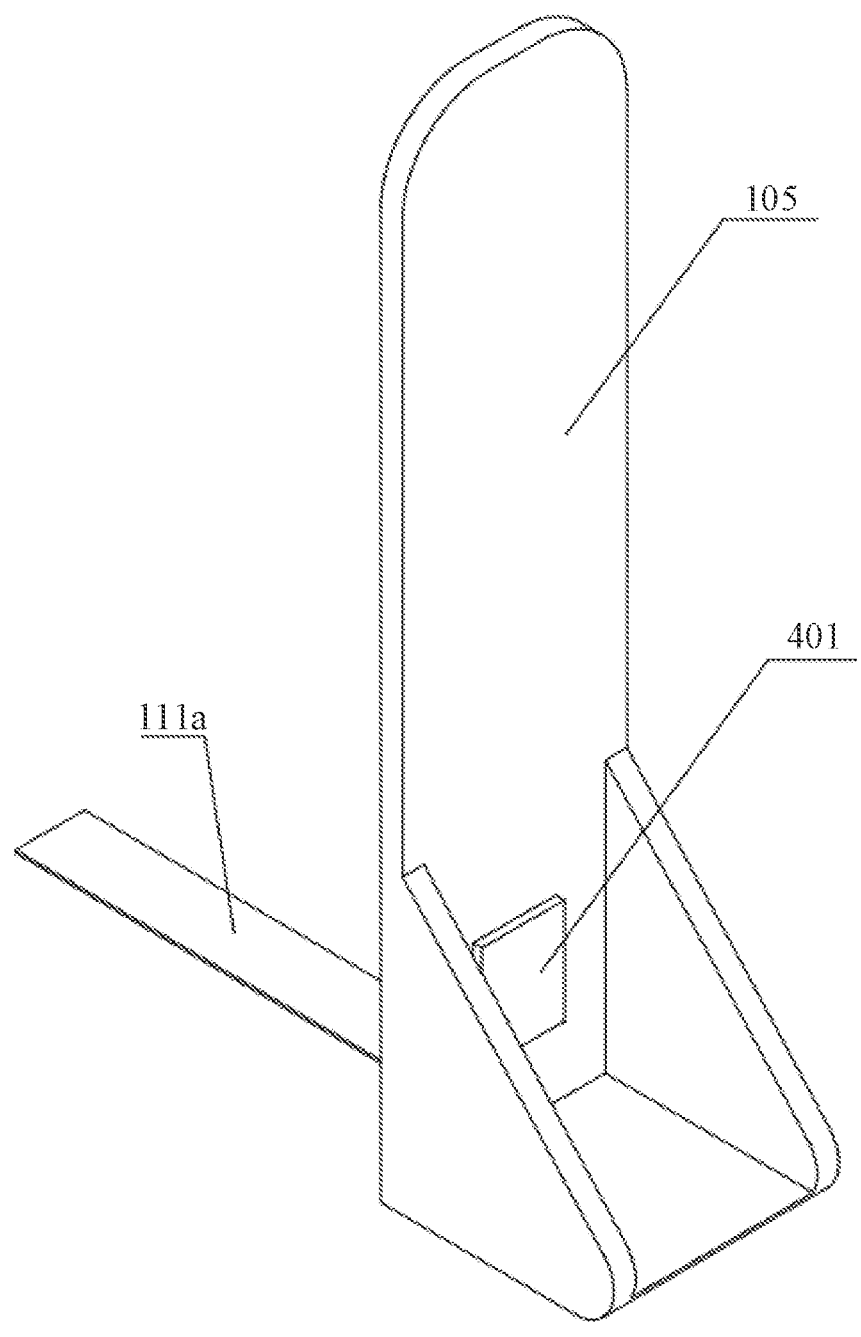
FIG. 13 is a mounting diagram of a magnetic block in Example 5 of the disclosure.

Based on Example 2, as shown in FIG. 12 and FIG. 13, FIG. 12 is a mounting diagram of a fastener in Example 5 of the disclosure; FIG. 13 is a mounting diagram of a magnetic block in Example 5 of the disclosure. The second fixed assembly 104 of the disclosure comprises a magnetic block 401 and a fastener 402.

The magnetic block 401 is connected to the tape head 111*a* and the head plate 105, and is disposed on the tape head 111*a*. The fastener 402 is fixedly connected to the head plate 105, and is disposed on the head plate 105. When fixing the tape head 111*a*, the magnetic block 401 is passed through the fastener 402 and adsorbed with the fastener 402 to complete the fixation of the tape head 111*a*.

Example 6

Figure 14:
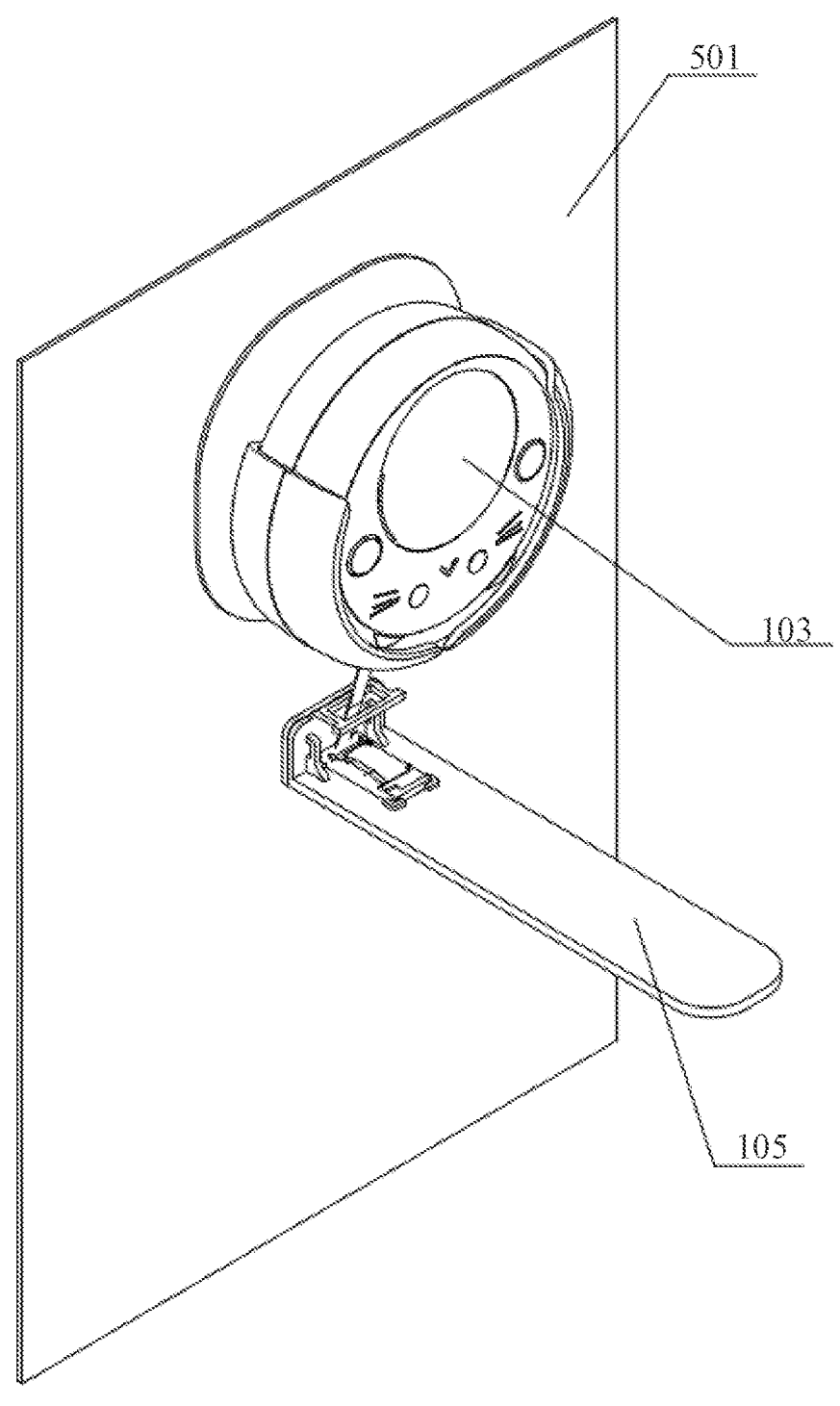
FIG. 14 is a mounting diagram of a magnetic sticker in Example 6 of the disclosure.

Based on Example 2, as shown in FIG. 14, which is a mounting diagram of a magnetic sticker in Example 6 of the disclosure. Specifically, the sticky graduation 101 is Example 2 is replaced by the magnetic sticker 501.

The magnetic sticker 501 is connected to the paster 106, and is located on one side of the paster 106 away from the female buckle 107. When in use, if the wall on which the height measuring system is fixed is magnetic, no need to install the sticky graduation 101, directly using the magnetic sticker 501 to fix the height measuring system on the wall through magnetic force. In case the magnetic sticker 501 is not effective, screws can be used to fix the height measuring system on the wall.

The height measuring system of the disclosure has the following characteristics:

1. The height measuring system is a detachable design and adopts the digital tape measure as a core element.
2. The digital tape measurer is easy to detach from the height measuring system and easy to use, and at the same time can also be used as an independent digital tape measure after removal.
3. The magnetic tape head has a good effect for height measurement.

It will be obvious to those skilled in the art that changes and modifications may be made, and therefore, the aim in the appended claims is to cover all such changes and modifications.

What is claimed is:

1. A height measurement system, comprising:
   1) a first fixed assembly, configured to connect to an external fixing part so that the height measurement system is fixed on the external fixing part for use;
   2) a head plate, configured to move downwards from the first fixed assembly to the head of a user;
   3) a second fixed assembly, disposed on the head plate and being movable along with the heat plate;
   4) a digital tape measure, comprising a mounting assembly and a tape disposed in the mounting assembly, one of the mounting assembly and the tape head being attached to the first fixing assembly and the other to the second fixing assembly;
   5) a memory storing a standard height value of the first fixed assembly connected to the external fixing part; and
   6) a data acquisition unit, configured to acquire a first tensile length of the tape when the head plate moves from the first fixed assembly to a top of the user's head, and transmitting the first tensile length to the memory, and the memory being configured to calculate the height of the user according to the standard height value and the first tensile length of the tape.

2. The system of claim 1, further comprising a data receiving device configured to receive an actual height value of the first fixed assembly attached to the external fixing part; and the memory being configured to calculate the height of the user according to the actual height value and the first tensile length of the tape.

3. The system of claim 2, wherein the memory is further configured to determine whether the actual height value from the data receiving device is received before calculating the height of the user; if so, the height of the user is calculated based on the actual height value and the first tensile length.

4. The system of claim 2, wherein the data receiving device disposed on the mounting assembly or an intelligent terminal independent of the height measurement system.

5. The system of claim 1, further comprising a data receiving device configured to receive a preset height value of the head plate; wherein the data acquisition unit is configured to obtain a second tensile length of the tape when the head plate moves from the preset height value to the top of the user's head, and transmit the second tensile length to the memory; and the memory is configured to calculate the height of the user according to the preset height value and the second tensile length of the tape.

6. The system of claim 5, wherein the memory is further configured to determine whether the preset height value from the data receiving device is received before calculating the height of the user, and if so, the height of the user is calculated based on the preset height value and the second tensile length.

7. The system of claim 6, wherein the data acquisition unit is a capacitive gate sensor.

8. The system of claim 7, wherein the capacitive gate sensor is disposed on the mounting assembly.

9. The system of claim 1, wherein the memory is disposed on the mounting assembly or an intelligent terminal independent of the height measurement system.

10. The system of claim 1, further comprising a result output device, wherein the memory is further configured to transmit the obtained height of the user to the result output device, and the result output device is configured to output the height of the user.

11. The system of claim 1, further comprising an information receiving device configured to receive instructions and configuration information; wherein the memory is further configured to receive the instructions and configuration information from the information receiving device and transmit the instructions and configuration information to the result output device; and the result output device is further configured to output corresponding content according to the instructions and configuration information.

12. The system of claim 11, wherein the result output device is disposed on the mounting assembly and/or an intelligent terminal independent of the height measurement system; and/or the information receiving device is disposed on the mounting assembly and/or an intelligent terminal independent of the height measurement system.

13. The system of claim 1, wherein the memory is also configured to compare the obtained height of the user with a previously obtained height of the user, and/or to compare the obtained height of the user with a standard value.

14. The system of claim 1, further comprising a sticky graduation attached to the external fixing part, and the first fixed assembly being disposed on the sticky graduation.

15. The system of claim 1, wherein the mounting assembly is connected to the first fixed assembly; the tape head is connected to the second fixed assembly; the first fixed assembly comprises a paster, a female buckle, a male buckle, and a housing; the paster is connected the external fixing part; the female buckle is fixed on one side of the paster; the male buckle is detachably connected to the female buckle and is disposed on the female buckle; the housing is fixedly connected to the male buckle; the digital tape measure is disposed in the housing.

16. The system of claim 15, wherein the housing comprises a plurality of grooves.

17. The system of claim 15, further comprising a magnetic sticker; wherein the magnetic sticker is connected to the paster and is disposed on one side of the paster away from the female buckle.

18. The system of claim 1, wherein the mounting assembly is connected to the first fixed assembly, and the tape head is connected to the second fixed assembly; the second fixed assembly comprises a buckle and a limit base fixedly connected to the head plate; the limit base is disposed on the head plate; the buckle is rotatably connected to the head plate, and is detachably connected to the limit base, and is also connected to the tape head.

19. The system of claim 18, further comprising a magnetic sheet, wherein the magnetic sheet is disposed on one end of the head plate; and the magnetic sheet is configured to magnetically adsorb the head plate on the external fixing part.

20. The system of claim 1, wherein the mounting assembly is connected to the first fixed assembly, and the tape head is connected to the second fixed assembly;

the second fixed assembly comprises a connection base and a connection column; the connection base is fixedly connected to the head plate and is disposed on the head plate; the connection column is connected to the tape head and is detachably connected to the connection base, and is disposed on the connection base.

21. The system of claim 1, wherein the mounting assembly is connected to the first fixed assembly, and the tape head is connected to the second fixed assembly;

the second fixed assembly comprises a magnetic block and a fastener, the magnetic block is connected to the tape head and is connected to the head plate, and is disposed on the tape head; the fastener is fixedly connected to the head plate and is disposed on the head plate.

* * * * *